(12) United States Patent
Yabuzaki (10) Patent No.: US 10,581,332 B2
(45) Date of Patent: Mar. 3, 2020

(54) DIMMER AND POWER CONVERTER

(71) Applicant: FUJI ELECTRIC CO., LTD., Kawasaki-shi, Kanagawa (JP)

(72) Inventor: Jun Yabuzaki, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 16/019,055

(22) Filed: Jun. 26, 2018

(65) Prior Publication Data
US 2019/0052176 A1    Feb. 14, 2019

(30) Foreign Application Priority Data
Aug. 9, 2017   (JP) .................. 2017-154210

(51) Int. Cl.
| | |
|---|---|
| *H02M 3/335* | (2006.01) |
| *H02M 1/08* | (2006.01) |
| *H05B 33/08* | (2006.01) |
| *H02M 1/32* | (2007.01) |
| *H02M 1/00* | (2006.01) |
| *H02M 1/42* | (2007.01) |
| *H02M 7/06* | (2006.01) |

(52) U.S. Cl.
CPC ......... *H02M 3/33523* (2013.01); *H02M 1/08* (2013.01); *H02M 1/32* (2013.01); *H05B 33/0815* (2013.01); *H05B 33/0851* (2013.01); *H02M 1/4208* (2013.01); *H02M 3/33515* (2013.01); *H02M 3/33561* (2013.01); *H02M 7/06* (2013.01); *H02M 2001/0006* (2013.01); *H02M 2001/007* (2013.01); *H02M 2001/0009* (2013.01); *H02M 2001/0025* (2013.01); *H02M 2001/0045* (2013.01)

(58) Field of Classification Search
None
See application file for complete search history.

(56) References Cited

U.S. PATENT DOCUMENTS

| | | | |
|---|---|---|---|
| 8,207,687 B1 * | 6/2012 | Rhodes ............. | H05B 33/0809 315/200 R |
| 8,576,589 B2 * | 11/2013 | Melanson ............. | H02J 7/0054 323/207 |

(Continued)

FOREIGN PATENT DOCUMENTS

JP    2010-20481    1/2010

OTHER PUBLICATIONS

"CDM10V: Flexible 0-10V Dimming Solution", CDM10V Data Sheet, Infineon Technologies AG, Aug. 1, 2016, pp. 22.

*Primary Examiner* — Alexander H Taningco
*Assistant Examiner* — Syed M Kaiser (57) ABSTRACT

A dimmer, according to an embodiment, includes a reference voltage circuit configured to output a reference voltage at a constant voltage when a power source voltage is higher than or equal to a predetermined threshold value, and output the reference voltage at a voltage proportional to the power source voltage when the power source voltage is lower than the predetermined threshold value. The dimmer further includes a bias current circuit; a control current circuit; an analog-to-digital converter; an output signal generation circuit; a first constant-current source; and a switch connected to the first constant-current source.

9 Claims, 9 Drawing Sheets

(56) References Cited

U.S. PATENT DOCUMENTS

| | | | |
|---|---|---|---|
| 2004/0095112 A1* | 5/2004 | Kernahan | H02M 1/0845 |
| | | | 323/282 |
| 2004/0095120 A1* | 5/2004 | Kernahan | H02M 1/0845 |
| | | | 323/282 |
| 2009/0140666 A1* | 6/2009 | Liao | H05B 33/0818 |
| | | | 315/291 |
| 2009/0184662 A1* | 7/2009 | Given | H05B 33/0815 |
| | | | 315/294 |
| 2011/0012530 A1* | 1/2011 | Zheng | H05B 33/0815 |
| | | | 315/294 |
| 2011/0068699 A1* | 3/2011 | Knapp | H04L 12/43 |
| | | | 315/158 |
| 2011/0187283 A1* | 8/2011 | Wang | H05B 37/02 |
| | | | 315/291 |
| 2012/0062136 A1* | 3/2012 | Tsai | H05B 33/0827 |
| | | | 315/224 |
| 2012/0176826 A1* | 7/2012 | Lazar | H02M 3/158 |
| | | | 363/126 |
| 2012/0200229 A1* | 8/2012 | Kunst | H05B 33/0815 |
| | | | 315/186 |
| 2012/0217882 A1* | 8/2012 | Wong | F21V 23/0464 |
| | | | 315/185 R |
| 2014/0092642 A1* | 4/2014 | Yoshinaga | H05B 33/0818 |
| | | | 363/21.12 |
| 2014/0265844 A1* | 9/2014 | Sadwick | H05B 33/0815 |
| | | | 315/85 |
| 2015/0231408 A1* | 8/2015 | Williams | A61N 5/06 |
| | | | 607/88 |
| 2016/0242253 A1* | 8/2016 | Bhagwat | H05B 33/0815 |
| 2017/0189640 A1* | 7/2017 | Sadwick | H05B 37/0272 |

* cited by examiner

DIMMER AND POWER CONVERTER

CROSS-REFERENCE TO RELATED APPLICATION

This application is based upon and claims the benefit of priority of the prior Japanese Patent Application No. 2017-154210, filed on Aug. 9, 2017, the entire contents of which are incorporated herein by reference.

BACKGROUND

1. Field

The embodiments discussed herein are related to a dimmer and a power converter.

2. Related Art

In order to adjust a light amount of a light emitting diode (LED) lighting fixture or an incandescent lamp lighting fixture, a power converter including a dimmer which adjusts a current or a voltage applied to the lighting fixture is used.

Figure 8:
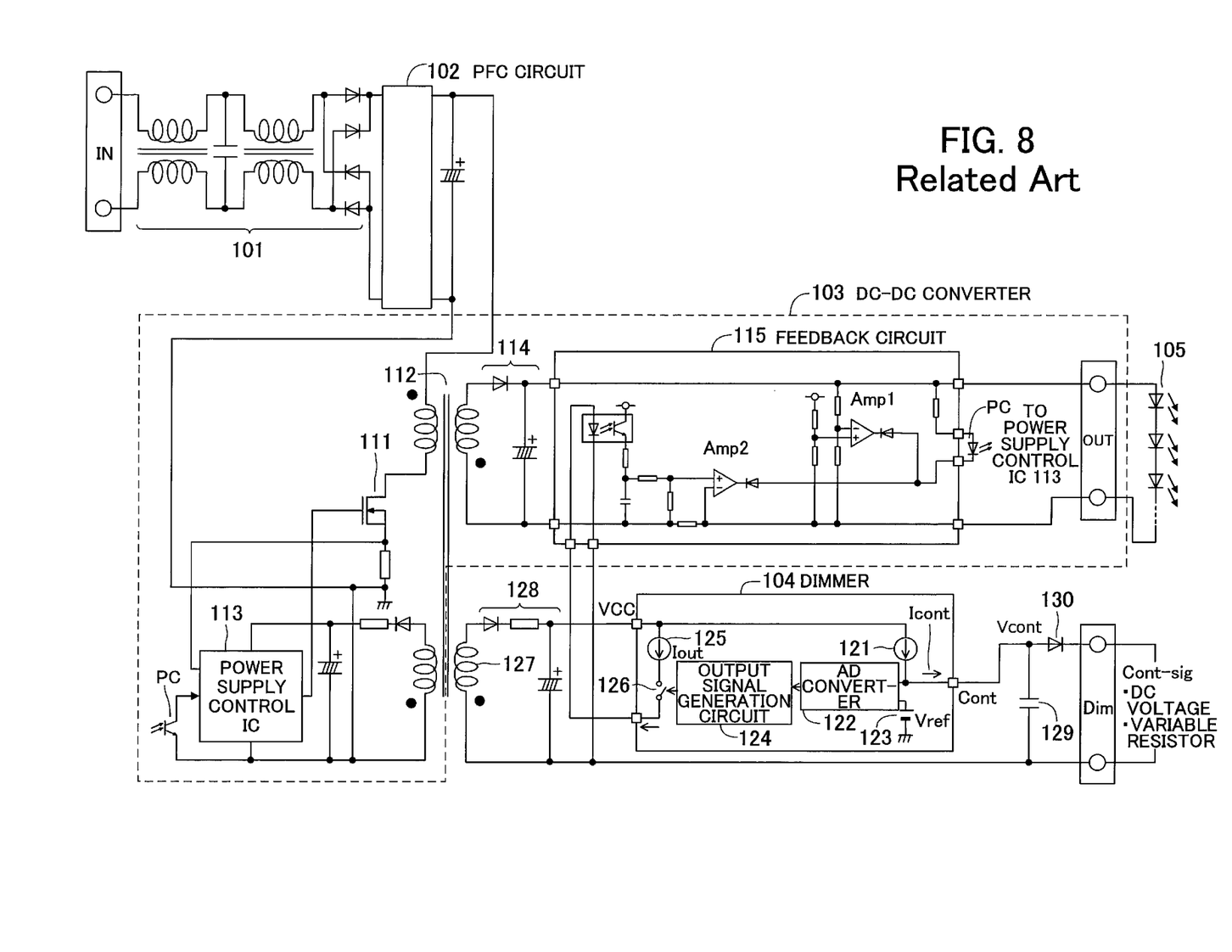
FIG. 8 is a circuit diagram illustrative of an example of the structure of a conventional power converter which controls an LED lighting fixture.
Figure 9A:
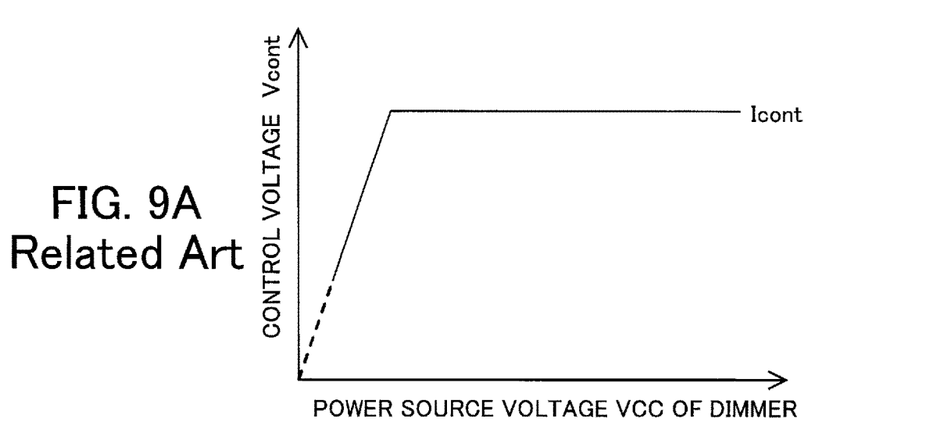
FIGS. 9A through 9C illustrate the characteristics of a dimmer, FIG. 9A illustrating a change in control voltage relative to a power source voltage, FIG. 9B illustrating a change in reference voltage relative to the power source voltage, and FIG. 9C illustrating a change in duty ratio relative to the power source voltage.
Figure 9B:
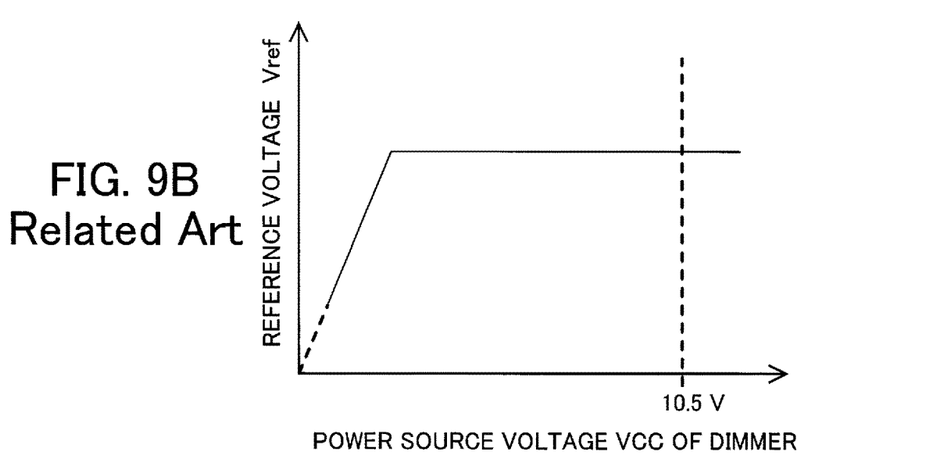
Figure 9C:
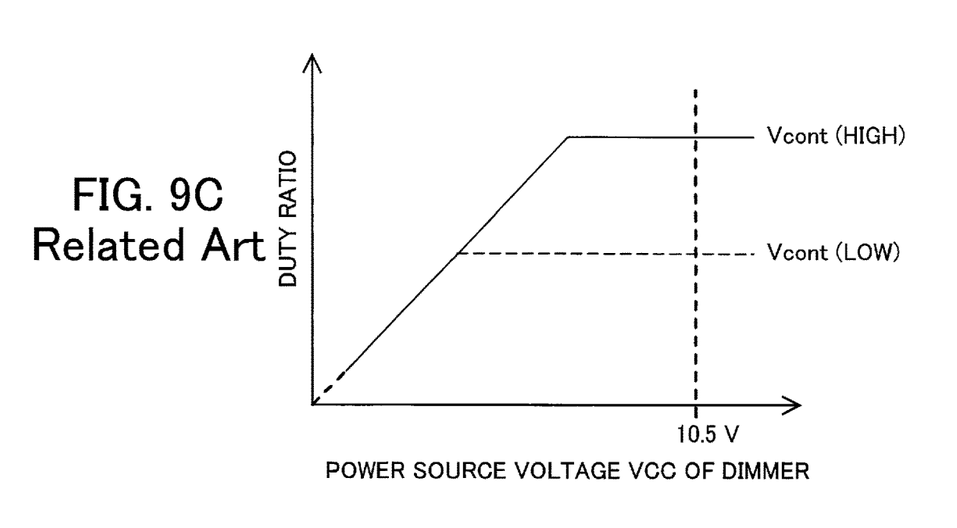

FIG. 8 is a circuit diagram illustrative of an example of the structure of a conventional power converter which controls an LED lighting fixture. FIGS. 9A through 9C illustrate the characteristics of a dimmer. FIG. 9A illustrates a change in control voltage relative to a power source voltage. FIG. 9B illustrates a change in reference voltage relative to the power source voltage. FIG. 9C illustrates a change in duty ratio relative to the power source voltage.

A power converter illustrated in FIG. 8 includes a rectifying circuit 101, a power factor correction (PFC) circuit 102, a direct current to direct current (DC-DC) converter 103, and a dimmer 104. An LED lighting fixture 105 is connected to an output terminal of the DC-DC converter 103. With this power converter, the rectifying circuit 101 rectifies the alternating current (AC) voltage of a commercial power source and the power factor correction circuit 102 outputs a DC voltage raised by the PFC circuit 102. This DC voltage is converted by the DC-DC converter 103 to a DC voltage having a desired value.

The DC-DC converter 103 is a flyback switching power supply circuit and includes a switching element 111, a transformer 112, a power supply control integrated circuit (IC) 113, a rectifying and smoothing circuit 114, and a feedback circuit 115. This DC-DC converter 103 stores electric power in the transformer 112 for a period for which the switching element 111 is in an on state. When the switching element 111 is turned off, the back electromotive force of the transformer 112 is used for outputting the stored electric power to the secondary side of the transformer 112. At this time a voltage error amplifier Amp1 in the feedback circuit 115 detects a DC output voltage outputted by the rectifying and smoothing circuit 114. Furthermore, a current error amplifier Amp2 in the feedback circuit 115 detects an output current supplied to the LED lighting fixture 105. Error signals outputted by the voltage error amplifier Amp1 and the current error amplifier Amp2 are fed back to the power supply control IC 113 via a photocoupler PC. The power supply control IC 113 controls switching of the switching element 111 in a direction in which the error signals become zero.

An output current outputted by the DC-DC converter 103 is set by the dimmer 104. The dimmer 104 includes a constant-current source 121, an analog-to-digital (AD) converter 122, a reference voltage source 123, an output signal generation circuit 124, a constant-current source 125, and a switch 126. The constant-current source 121 generates a control current Icont, which is a constant current, from a power source voltage VCC generated by an auxiliary winding 127 of the transformer 112 and a rectifying and smoothing circuit 128. The control current Icont outputted by the constant-current source 121 is supplied to a capacitor 129 via a control terminal Cont of the dimmer 104 and is supplied to a dimming input terminal Dim via a diode 130. A variable DC voltage is inputted as an external control signal Cont-sig to the dimming input terminal Dim or a variable resistor is connected to the dimming input terminal Dim. If the external control signal Cont-sig, which is a DC voltage, is inputted to the dimming input terminal Dim, a control voltage Vcont obtained by adding a forward voltage of the diode 130 to the input DC voltage appears at the control terminal Cont of the dimmer 104. If the variable resistor is connected to the dimming input terminal Dim, the control current Icont outputted by the constant-current source 121 flows through the variable resistor. As a result, a voltage corresponding to a resistance value of the variable resistor is generated across both ends of the variable resistor. Therefore, the control voltage Vcont obtained by adding the forward voltage of the diode 130 to the voltage across both ends of the variable resistor appears at the control terminal Cont of the dimmer 104. The control current Icont outputted by the constant-current source 121 is constant. Therefore, as illustrated in FIG. 9A, the control voltage Vcont is constant and does not change if the power source voltage VCC does not drop significantly.

The analog control voltage Vcont which appears at the control terminal Cont of the dimmer 104 is converted by the AD converter 122 to a digital signal on the basis of a reference voltage Vref of the reference voltage source 123. The control voltage Vcont inputted to the AD converter 122 may be divided in the AD converter 122 and a voltage value obtained by the voltage division may be compared with the reference voltage Vref. The reason for this is as follows. If the reference voltage Vref is low and an allowable input voltage range of the control voltage Vcont is narrow, then there is a need to accurately set the control voltage Vcont. In order to widen the input voltage range of the control voltage Vcont, a voltage division circuit is disposed. Accordingly, the maximum value of an allowable input voltage of the control voltage Vcont is considerably larger than the reference voltage Vref.

The reference voltage source 123 uses a Zener diode for generating the reference voltage Vref from the power source voltage VCC of the dimmer 104. Usually the reference voltage Vref is set to a value sufficiently smaller than the power source voltage VCC so that it will not be influenced by fluctuations in the power source voltage VCC. As illustrated in FIG. 9B, the reference voltage Vref is constant if the power source voltage VCC does not drop considerably. However, a method for avoiding a drop in the power source voltage VCC below a Zener voltage of the Zener diode by the influence of fluctuations in the power source voltage VCC is known (see, for example, Japanese Laid-open Patent Publication No. 2010-20481). This method is as follows. When a power source voltage falls below the Zener voltage of a Zener diode, a supplementary current is passed through a voltage division resistor on a low-voltage side of a reference voltage generation circuit. By doing so, the voltage of the voltage division resistor on the low-voltage side is raised by a value corresponding to a fall in voltage caused by the supplementary current. As a result, a fall in reference voltage is suppressed.

An output signal of the AD converter 122 is inputted to the output signal generation circuit 124 and is converted to a pulse width modulation (PWM) signal with a duty ratio corresponding to a value of the control voltage Vcont at the control terminal Cont. The switch 126 is on-off controlled by the PWM signal outputted by the output signal generation circuit 124, pulse-width-modulates a constant current Iout outputted by the constant-current source 125, and supplies the pulse-width-modulated constant current Iout to the feedback circuit 115. At this time the following relationship exists between the control voltage Vcont at the control terminal Cont and the duty ratio. As illustrated in FIG. 9C, if the control voltage Vcont is high, then the duty ratio is high. If the control voltage Vcont is low, then the duty ratio is low. Furthermore, if the power source voltage VCC falls, a range in which the duty ratio is kept constant narrows with an increase in the control voltage Vcont.

In the feedback circuit 115, the pulse-width-modulated constant current Iout is supplied via a photocoupler and a low-pass filter to a non-inverting input terminal (+) of the current error amplifier Amp2 to which a reference signal is inputted. Accordingly, the voltage of a reference signal of the current error amplifier Amp2 is set to a value corresponding to the variable DC voltage or the control voltage Vcont set by the variable resistor. As a result, an output current supplied to the LED lighting fixture 105 is controlled by the power supply control IC 113 so that it will correspond to the control voltage Vcont. Therefore, the brightness of the LED lighting fixture 105 is adjusted so that it will correspond to the control voltage Vcont.

If the variable resistor is connected as the external control signal Cont-sig in the conventional power converter, the control voltage Vcont is generated by passing the control current Icont through the variable resistor. In this case, it is desirable to set the brightness of the LED lighting fixture 105 at 100 percent when the variable resistor has the largest resistance value. However, if a resistance value of the variable resistor is small, it is impossible to set the brightness of the LED lighting fixture 105 at 100 percent even by maximizing the resistance value of the variable resistor. On the other hand, if a resistance value of the variable resistor is large, the brightness of the LED lighting fixture 105 reaches 100 percent before a resistance value of the variable resistor is maximized.

In addition, the control current Icont outputted by the constant-current source 121 has the property of changing according to the power source voltage VCC of the dimmer 104. For example, if a resistance value of the variable resistor is made small to dim the brightness of the LED lighting fixture 105, then the DC-DC converter 103 is controlled so as to decrease an output current supplied to the LED lighting fixture 105. Because at this time a current supplied to the auxiliary winding 127 of the transformer 112 is also decreased, the power source voltage VCC is decreased.

The constant-current source 121 does not have a voltage boosting function. Therefore, when the power source voltage VCC drops and becomes lower than or equal to the control voltage Vcont, the control voltage Vcont does not become higher than or equal to the power source voltage VCC and drops with the power source voltage VCC. As a result, the duty ratio of a PWM signal outputted by the output signal generation circuit 124 becomes lower than an original duty ratio. That is to say, an output current decreases and a light amount of the LED lighting fixture 105 becomes smaller than a set light amount.

SUMMARY

According to an aspect, there is provided a dimmer including a reference voltage circuit which outputs a reference voltage having a constant value when a power source voltage is higher than or equal to a determined value (predetermined threshold voltage) and which outputs the reference voltage having a value proportional to the power source voltage when the power source voltage is lower than the determined value, a bias current circuit which converts the reference voltage to a bias current, a control current circuit which converts, to a control current, a voltage generated by supplying the bias current to an externally connected resistor, an analog-to-digital (AD) converter which converts, to a digital signal, a control voltage generated by receiving the reference voltage and supplying the control current to an externally connected variable resistor, an output signal generation circuit which generates from the digital signal a duty ratio signal having a duty ratio corresponding to a control ratio of the variable resistor, a first constant-current source which outputs a first constant current, and a switch which is connected to the first constant-current source and which is turned on or off by the duty ratio signal.

Additional aspects and/or advantages will be set forth in part in the description which follows and, in part, will be apparent from the description, or may be learned by practice of the invention.

It is to be understood that both the foregoing general description and the following description of embodiments provide illustrative examples and explanations and are not restrictive of the invention.

DESCRIPTION OF EMBODIMENTS

An embodiment will now be described in detail with reference to the accompanying drawings with a case where the present disclosure is applied to a power converter for an LED lighting fixture as an example. In the following description the same numerals may be used for representing the names of terminals and voltages, signals, and the like at the terminals.

Figure 1:
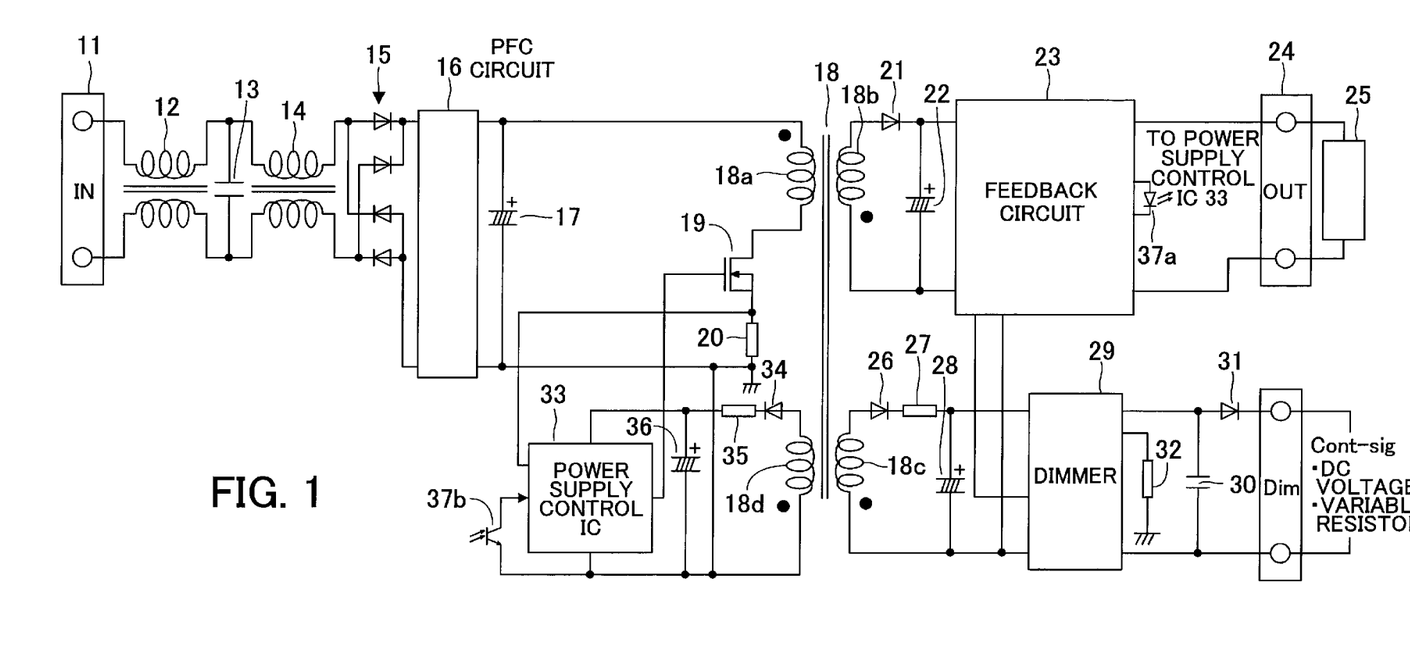
FIG. 1 is a circuit diagram illustrative of an example of the structure of a power converter according to an embodiment.
Figure 2:
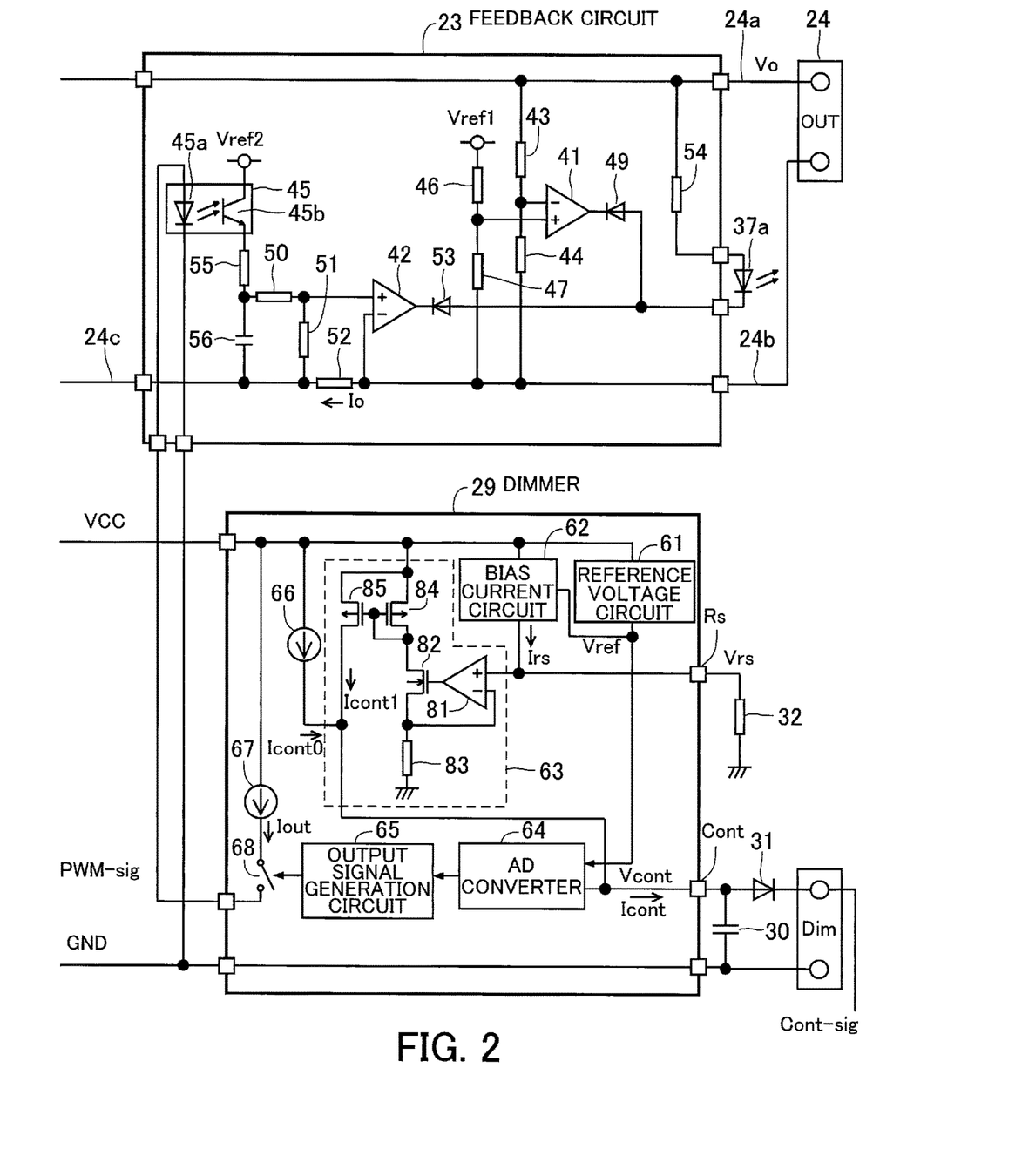
FIG. 2 is a circuit diagram illustrative of an example of the structure of a feedback circuit and a dimmer of the power converter.
Figure 3:
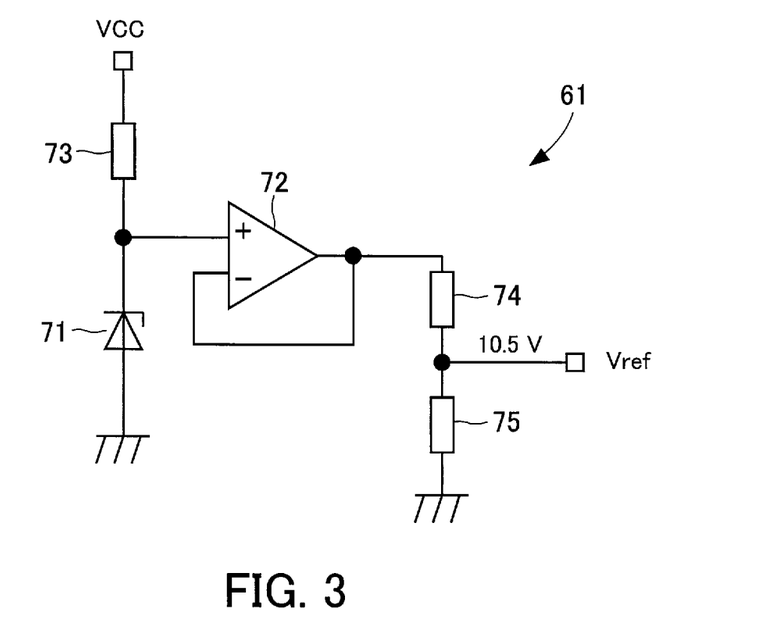
FIG. 3 is a circuit diagram illustrative of an example of the structure of a reference voltage circuit of the dimmer.
Figure 4:
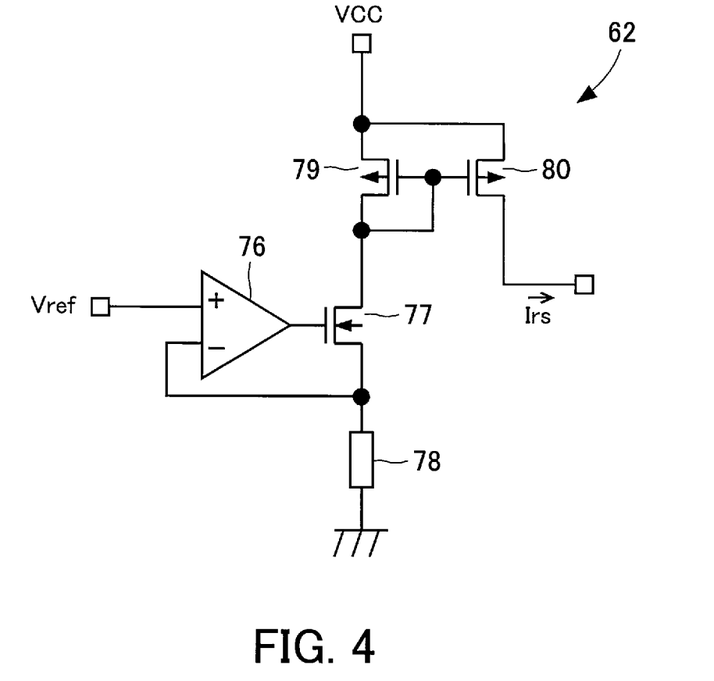
FIG. 4 is a circuit diagram illustrative of an example of the structure of a bias current circuit of the dimmer.
Figure 5:
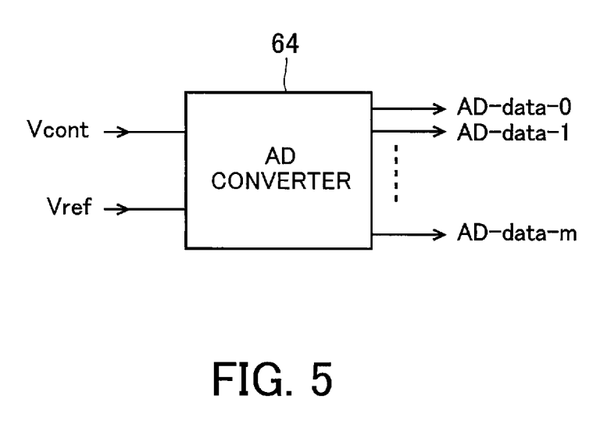
FIG. 5 illustrates an AD converter of the dimmer.
Figure 6:
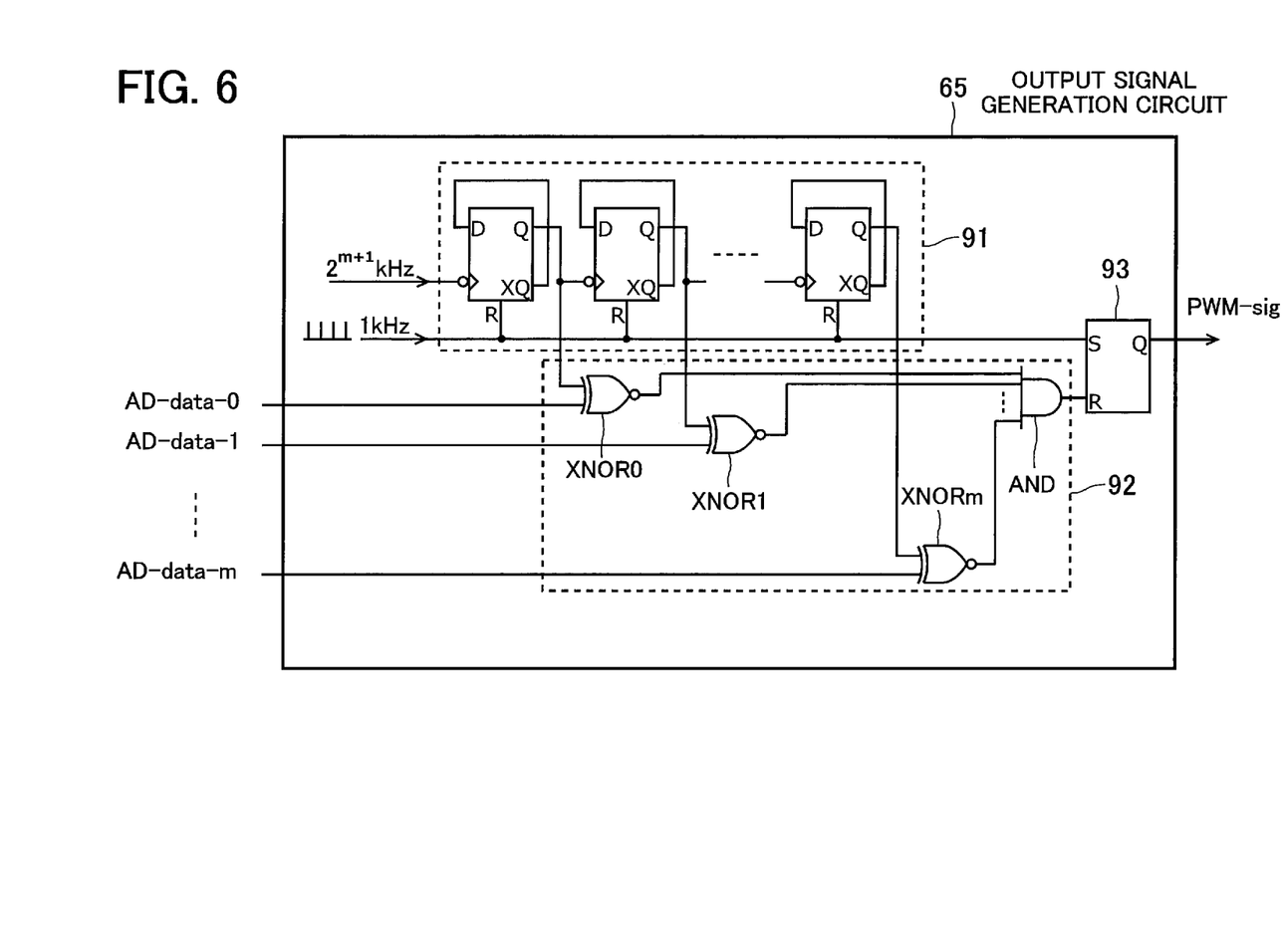
FIG. 6 is a circuit diagram illustrative of an example of the structure of an output signal generation circuit of the dimmer.
Figure 7A:
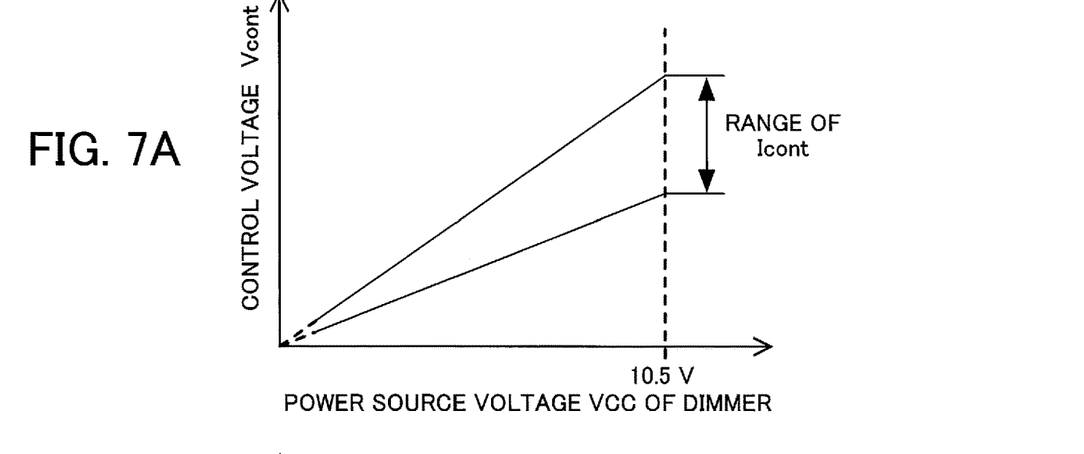
FIGS. 7A through 7C illustrate the characteristics of the dimmer, FIG. 7A illustrating a change in control voltage relative to a power source voltage, FIG. 7B illustrating a change in reference voltage relative to the power source voltage, and FIG. 7C illustrating a change in duty ratio relative to the power source voltage.
Figure 7B:
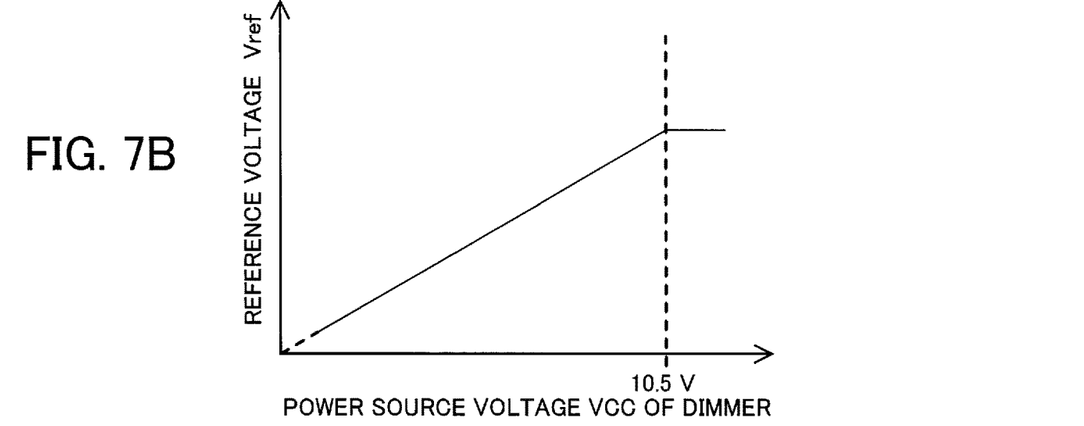
Figure 7C:
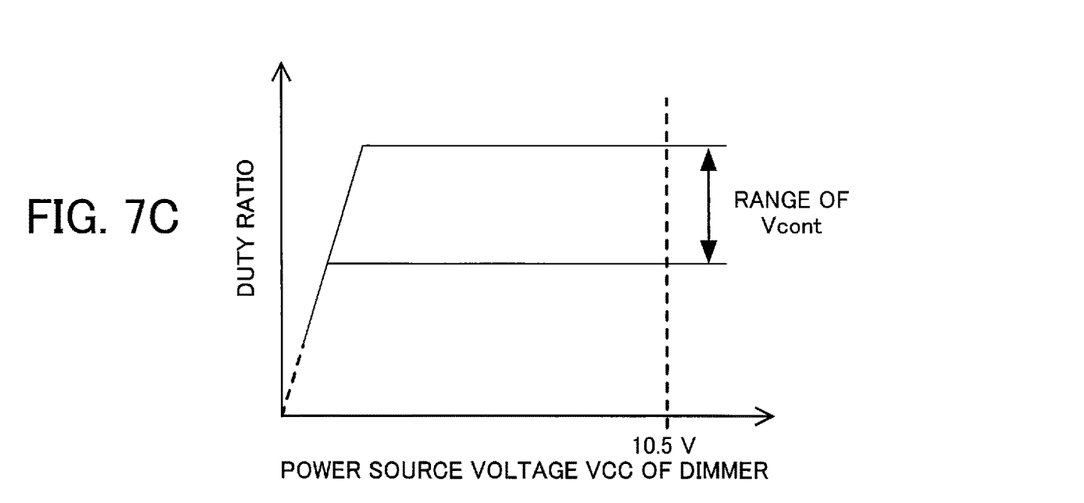

FIG. 1 is a circuit diagram illustrative of an example of the structure of a power converter according to an embodiment. FIG. 2 is a circuit diagram illustrative of an example of the structure of a feedback circuit and a dimmer of the power converter. FIG. 3 is a circuit diagram illustrative of an example of the structure of a reference voltage circuit of the dimmer. FIG. 4 is a circuit diagram illustrative of an example of the structure of a bias current circuit of the dimmer. FIG. 5 illustrates an AD converter of the dimmer. FIG. 6 is a circuit diagram illustrative of an example of the structure of an output signal generation circuit of the dimmer. FIGS. 7A through 7C illustrate the characteristics of the dimmer. FIG. 7A illustrates a change in control voltage relative to a power source voltage. FIG. 7B illustrates a change in reference voltage relative to the power source voltage. FIG. 7C illustrates a change in duty ratio relative to the power source voltage.

As illustrated in FIG. 1, a power converter includes an AC input terminal 11 connected to a commercial AC power source. A choke coil 12, an X capacitor 13, and a choke coil 14 which make up a noise filter are connected to the AC input terminal 11. A diode bridge 15 which full-wave-rectifies an AC voltage passing through the noise filter is connected to the choke coil 14.

A power factor correction circuit 16 is connected to the diode bridge 15. The power factor correction circuit 16 corrects a power factor which becomes low in switching operation in the case of the deviation of a current phase from a voltage phase caused by connecting an inductive load or a capacitive load. The power factor correction circuit 16 outputs a high and constant DC voltage by boosting and rectifying a rectified voltage outputted from the diode bridge 15.

A capacitor 17 is connected to an output of the power factor correction circuit 16. The capacitor 17 supplies stable energy to a circuit which performs switching operation, and reduces switching noise generated by switching operation. A series circuit including a primary winding 18a of a transformer 18, a switching element 19, and a current detection resistor 20 and the capacitor 17 are connected in parallel. In this example, a metal oxide semiconductor field effect transistor (MOSFET; hereinafter referred to as a MOS transistor) is used as the switching element 19.

A rectifying and smoothing circuit made up of a diode 21 and a capacitor 22 is connected to a secondary winding 18b of the transformer 18. Terminals at both ends of the capacitor 22 are connected to a DC output terminal 24 via a feedback circuit 23. A load 25, which is an LED lighting fixture, is connected to the DC output terminal 24.

Furthermore, the transformer 18 has an auxiliary winding 18c on the secondary side. A rectifying and smoothing circuit made up of a diode 26, a resistor 27, and a capacitor 28 is connected to the auxiliary winding 18c. Terminals at both ends of the capacitor 28 are connected to a dimmer 29. A capacitor 30 is connected to an input of the dimmer 29. One terminal of the capacitor 30 is connected to an anode of a diode 31. A cathode of the diode 31 and the other terminal of the capacitor 30 are connected to a dimming input terminal Dim which receives an external control signal Cont-sig. The external control signal Cont-sig is a DC voltage or a variable resistor. Furthermore, the dimmer 29 is connected to one terminal of a constant-current value setting resistor 32 which sets a current value of a constant current flowing to the dimming input terminal Dim. The other terminal of the constant-current value setting resistor 32 is connected to ground. An output of the dimmer 29 is connected to the feedback circuit 23.

A gate of the switching element 19 is connected to an output of a power supply control IC (power supply control circuit) 33. Power is supplied to the power supply control IC 33 from a power source circuit made up of an auxiliary winding 18d on the primary side of the transformer 18 and a rectifying and smoothing circuit including a diode 34, a resistor 35, and a capacitor 36.

The power supply control IC 33 is connected to a connection point of a source of the switching element 19 and a current detection resistor 20. An overcurrent protection function built in the power supply control IC 33 monitors a voltage which appears at both ends of the current detection resistor 20. When the overcurrent protection function detects a voltage corresponding to an overcurrent flowing through the switching element 19 and having a current value greater than or equal to a determined value (predetermined threshold voltage), the overcurrent protection function stops switching operation by the switching element 19 and protects the switching element 19 against a break caused by the overcurrent.

Furthermore, the power supply control IC 33 is connected to the feedback circuit 23 via a photocoupler. That is to say, a light-emitting diode 37a is included in the feedback circuit 23 and a phototransistor 37b is included in the power supply control IC 33. The light-emitting diode 37a and the phototransistor 37b make up the photocoupler. As a result, the feedback circuit 23 detects an output voltage and an output current supplied to the load 25 and feeds back them to the power supply control IC 33. On the basis of a signal fed back from the feedback circuit 23, the power supply control IC 33 controls switching of the switching element 19 so as to make the output voltage or the output current a value designated by the external control signal Cont-sig.

A concrete example of the structure of the feedback circuit 23 and the dimmer 29 of the power converter will now be described with reference to FIGS. 2 through 6.

The feedback circuit 23 includes operational amplifiers 41 and 42. An inverting input terminal of the operational amplifier 41 is connected to an output terminal of a voltage division circuit made up of resistors 43 and 44. One terminal of the resistor 43 is connected to a line 24a connected to a positive electrode terminal of a DC output terminal 24 and the other terminal of the resistor 43 is connected to the inverting input terminal of the operational amplifier 41 and one terminal of the resistor 44. The other terminal of the resistor 44 is connected to a line 24b connected to a negative electrode terminal of the DC output terminal 24. As a result, a voltage proportional to an output voltage Vo is applied to the inverting input terminal of the operational amplifier 41.

On the other hand, a non-inverting input terminal of the operational amplifier 41 is connected to a fixed reference voltage source made up of resistors 46 and 47. One terminal of the resistor 46 is connected to a line of a voltage Vref1 and the other terminal of the resistor 46 is connected to the non-inverting input terminal of the operational amplifier 41 and one terminal of the resistor 47. The other terminal of the resistor 47 is connected to the line 24b.

An output terminal of the operational amplifier 41 is connected to a cathode of a diode 49. The operational amplifier 41, the resistors 43, 44, 46, and 47, and the diode 49 make up a voltage error amplifier which detects an error between a desired output voltage and an actual output voltage Vo.

A non-inverting input terminal of the operational amplifier 42 is connected to a variable reference voltage source made up of a phototransistor 45b of a photocoupler 45, resistors 50, 51, and 55, a current detection resistor 52, and a capacitor 56. A collector of the phototransistor 45b of the photocoupler 45 is connected to a line of a voltage Vref2 and an emitter of the phototransistor 45b is connected to one terminal of the resistor 55. The other terminal of the resistor 55 is connected to one terminal of the capacitor 56. The resistor 55 and the capacitor 56 make up a low-pass filter. The other terminal of the capacitor 56 is connected to a line 24c connected to a negative electrode terminal of the capacitor 22 of the rectifying and smoothing circuit. A connection point of the resistor 55 and the capacitor 56 is connected to one terminal of the resistor 50. The other terminal of the resistor 50 is connected to the non-inverting input terminal of the operational amplifier 42 and one terminal of the resistor 51. The other terminal of the resistor 51 is connected to the line 24c. Furthermore, the other terminal of the resistor 51 is connected to one terminal of the current detection resistor 52. The other terminal of the current detection resistor 52 is connected to an inverting input terminal of the operational amplifier 42 and the line 24b.

An output terminal of the operational amplifier 42 is connected to a cathode of a diode 53. The operational amplifier 42, the phototransistor 45b of the photocoupler 45, the resistors 50, 51, and 55, the current detection resistor 52, the capacitor 56, and the diode 53 make up a current error amplifier which detects an error between a desired output current and an actual output current Io.

An anode of the diode 49 of the voltage error amplifier and an anode of the diode 53 of the current error amplifier are connected to a cathode of the light-emitting diode 37a of the photocoupler which feeds back an error signal to the power supply control IC 33. An anode of the light-emitting diode 37a is connected to one terminal of a resistor 54. The other terminal of a resistor 54 is connected to the line 24a connected to the positive electrode terminal of the DC output terminal 24.

With this feedback circuit 23, the operational amplifier 41 compares a voltage obtained by dividing the output voltage Vo with a voltage obtained by dividing the voltage Vref1 of the reference voltage source, and outputs a signal indicative of an error between them. When the voltage obtained by dividing the output voltage Vo is lower than the voltage obtained by dividing the voltage Vref1 of the reference voltage source, the operational amplifier 41 outputs a positive error signal. At this time the potential of the cathode of the light-emitting diode 37a rises. Therefore, a current flowing through the light-emitting diode 37a decreases and information regarding the current is fed back to the power supply control IC 33. In this case, the power supply control IC 33 controls switching of the switching element 19 in a direction in which the output voltage Vo rises.

Conversely, when the voltage obtained by dividing the output voltage Vo is higher than the voltage obtained by dividing the voltage Vref1 of the reference voltage source, the operational amplifier 41 outputs a negative error signal. At this time the potential of the cathode of the light-emitting diode 37a drops. Therefore, a current flowing through the light-emitting diode 37a increases and information regarding the current is fed back to the power supply control IC 33. In this case, the power supply control IC 33 controls switching of the switching element 19 in a direction in which the output voltage Vo drops.

When the potential of the line 24c connected to the negative electrode terminal of the capacitor 22 of the rectifying and smoothing circuit is considered as reference, the operation of the current error amplifier is easy to understand. The operational amplifier 42 compares a drop in voltage in the current detection resistor 52 caused by the output current Io with a voltage of the variable reference voltage source, and outputs a signal indicative of an error between them. At this time the voltage of the variable reference voltage source is set in a setting signal having a value corresponding to an output signal PWM-sig outputted from the dimmer 29. The output signal PWM-sig received by a light-emitting diode 45a of the photocoupler 45 is a PWM signal. The phototransistor 45b is turned on or off in accordance with this PWM signal. Accordingly, a voltage which phototransistor 45b supplies to the resistor 55 also has a PWM waveform. This PWM waveform is averaged by the low-pass filter made up of the resistor 55 and the capacitor 56. A voltage after the averaging is divided by a voltage division circuit made up of the resistors 50 and 51 and a voltage after the division is inputted as a set voltage of the reference voltage source to the non-inverting input terminal of the operational amplifier 42. A voltage which appears at the other terminal of the current detection resistor 52 is inputted to the inverting input terminal of the operational amplifier 42 and is compared with the voltage of the reference voltage source.

When the voltage which appears at the other terminal of the current detection resistor 52 is lower than the voltage of the variable reference voltage source, the operational amplifier 42 outputs a positive error signal. At this time the potential of the cathode of the light-emitting diode 37a rises. Therefore, a current flowing through the light-emitting diode 37a decreases and information regarding the current is fed back to the power supply control IC 33. In this case, the power supply control IC 33 controls switching of the switching element 19 in a direction in which the output current Io increases.

Conversely, when the voltage which appears at the other terminal of the current detection resistor 52 is higher than the voltage of the variable reference voltage source, the operational amplifier 42 outputs a negative error signal. At this time the potential of the cathode of the light-emitting diode 37a drops. Therefore, a current flowing through the light-emitting diode 37a increases and information regarding the current is fed back to the power supply control IC 33. In this case, the power supply control IC 33 controls switching of the switching element 19 in a direction in which the output current Io decreases.

The voltage of the variable reference voltage source has a voltage value set by the dimmer 29. Therefore, an adjustment is eventually carried out so that the output current Io, to which the voltage which appears at the other terminal of the current detection resistor 52 corresponds, will have a value set by the dimmer 29.

The diode 49 connected to the output terminal of the operational amplifier 41 and the diode 53 connected to the output terminal of the operational amplifier 42 are connected by wired-OR connection. Furthermore, the voltage error amplifier includes the operational amplifier 41 and an output of the voltage error amplifier in a steady state is higher than an output of the current error amplifier. Accordingly, in a normal state, an output of the operational amplifier 42 included in the current error amplifier has priority over an output of the operational amplifier 41 and changes the value of a current flowing through the light-emitting diode 37a.

The dimmer 29 includes a reference voltage circuit 61, a bias current circuit 62, a control current circuit 63, an AD converter 64, an output signal generation circuit 65, constant-current sources 66 and 67, and a switch 68.

An input of the dimmer 29 is connected to the anode of the diode 31. The cathode of the diode 31 is connected to the dimming input terminal Dim. The diode 31 is used for preventing an unexpected current from flowing from the dimming input terminal Dim into the dimmer 29. The reason for this is as follows. The external control signal Cont-sig may be generated by a power source other than a power source of the dimmer 29. In that case, the external control signal Cont-sig may be higher than a power source voltage VCC of the dimmer 29. Furthermore, the capacitor 30 connected to the input of the dimmer 29 is used for cutting down on external noise.

As illustrated in FIG. 3, the reference voltage circuit 61 includes a Zener diode 71, an operational amplifier 72, and resistors 73, 74, and 75. A cathode of the Zener diode 71 is connected to one terminal of the resistor 73. The other terminal of the resistor 73 is connected to a line of the power source voltage VCC of the dimmer 29. An anode of the Zener diode 71 is connected to ground. A connection point of the resistor 73 and the Zener diode 71 is connected to a non-inverting input terminal of the operational amplifier 72. An inverting input terminal of the operational amplifier 72 is connected to an output terminal of the operational amplifier 72. The output terminal of the operational amplifier 72 is connected to one terminal of the resistor 74. The other terminal of the resistor 74 is connected to one terminal of the resistor 75 and an output terminal Vref of the reference voltage circuit 61. The other terminal of the resistor 75 is connected to the ground. In this embodiment, the reference voltage circuit 61 includes one Zener diode 71. However, the reference voltage circuit 61 may include a plurality of Zener diodes 71 connected in series at need. Furthermore, if a reference voltage Vref to be outputted is equal to a Zener voltage of the Zener diode 71, a voltage division circuit made up of the resistors 74 and 75 and connected to the output terminal of the operational amplifier 72 is not needed.

As has been described, if the power source voltage VCC of the dimmer 29 is equal to or higher than the Zener voltage of the Zener diode 71, then the reference voltage circuit 61 generates a constant voltage (that is to say, the Zener voltage of the Zener diode 71) from the power source voltage VCC of the dimmer 29 by the use of the Zener diode 71 and separates the constant voltage from a circuit of the Zener diode 71 by a voltage follower circuit formed of the operational amplifier 72. The constant voltage outputted by the voltage follower circuit is divided by the voltage division circuit made up of the resistors 74 and 75 to obtain the reference voltage Vref having a desired value. This reference voltage Vref is supplied as a reference voltage to the bias current circuit 62 and the AD converter 64.

Furthermore, if the power source voltage VCC of the dimmer 29 is lower than the Zener voltage of the Zener diode 71, then the reference voltage circuit 61 outputs as the reference voltage Vref a variable voltage proportional to the power source voltage VCC. For example, it is assumed that the voltage division circuit made up of the resistors 74 and 75 is not used and that the Zener voltage of the Zener diode 71 is 10.5 V. If the power source voltage VCC of the dimmer 29 is higher than or equal to 10.5 V, then the reference voltage circuit 61 outputs a reference voltage Vref of 10.5 V. If the power source voltage VCC is lower than 10.5 V, then the reference voltage circuit 61 outputs the reference voltage Vref proportional to the power source voltage VCC.

As illustrated in FIG. 4, the bias current circuit 62 includes an operational amplifier 76, a MOS transistor 77, a resistor 78, and MOS transistors 79 and 80.

The reference voltage Vref outputted from the reference voltage circuit 61 is applied to a non-inverting input terminal of the operational amplifier 76. An output terminal of the operational amplifier 76 is connected to a gate of the MOS transistor 77. A source of the MOS transistor 77 is connected to an inverting input terminal of the operational amplifier 76 and one terminal of the resistor 78. The other terminal of the resistor 78 is connected to ground. The operational amplifier 76, the MOS transistor 77, and the resistor 78 make up a transconductance amplifier which converts the reference voltage Vref to a current.

A drain of the MOS transistor 77 is connected to a drain and a gate of the MOS transistor 79. A source of the MOS transistor 79 is connected to the line of the power source voltage VCC of the dimmer 29. Furthermore, the drain and the gate of the MOS transistor 79 are connected to a gate of the MOS transistor 80. A source of the MOS transistor 80 is connected to the line of the power source voltage VCC of the dimmer 29. As a result, the MOS transistors 79 and 80 make up a current mirror circuit. In addition, a drain of the MOS transistor 80 is an output terminal of the bias current circuit 62.

With the bias current circuit 62, the transconductance amplifier converts the reference voltage Vref to a current and the current mirror circuit outputs a bias current Irs obtained by performing constant multiplication of the current after the conversion.

That is to say, the non-inverting input terminal and the inverting input terminal of the operational amplifier 76 are in a virtual short-circuit state. Accordingly, if the reference voltage Vref is applied to the non-inverting input terminal of the operational amplifier 76, the potential of the inverting input terminal of the operational amplifier 76 also becomes the reference voltage Vref. This means that the reference voltage Vref is applied to the one terminal of the resistor 78. Therefore, a constant current determined by the resistance value of the resistor 78 and the reference voltage Vref flows through the MOS transistor 77 and the resistor 78. Constant multiplication of this constant current is performed by the current mirror circuit and the obtained bias current Irs is outputted from the output terminal of the bias current circuit 62. The output terminal of the bias current circuit 62 is connected to the control current circuit 63 and a resistor connection terminal Rs of the dimmer 29.

As illustrated in FIG. 2, the constant-current value setting resistor 32 is connected to the resistor connection terminal Rs. A voltage Vrs is generated across the constant-current value setting resistor 32 by passing the bias current Irs through the constant-current value setting resistor 32, and is inputted to the control current circuit 63. The constant-current value setting resistor 32 is used for making, when a variable resistor is connected to the dimming input terminal Dim, a control current Icont flowing through the variable resistor variable according to a resistance value of the variable resistor.

The structure of the control current circuit 63 is the same as that of the bias current circuit 62 illustrated in FIG. 4. That is to say, the control current circuit 63 includes an operational amplifier 81, a MOS transistor 82, and a resistor 83 which make up a transconductance amplifier and MOS transistors 84 and 85 which make up a current mirror circuit.

The voltage Vrs generated by the constant-current value setting resistor 32 is applied to a non-inverting input terminal of the operational amplifier 81. An output terminal of the operational amplifier 81 is connected to a gate of the MOS transistor 82. A source of the MOS transistor 82 is connected to an inverting input terminal of the operational amplifier 81 and one terminal of the resistor 83. The other terminal of the resistor 83 is connected to the ground.

A drain of the MOS transistor 82 is connected to a drain and a gate of the MOS transistor 84. A source of the MOS transistor 84 is connected to the line of the power source voltage VCC of the dimmer 29. Furthermore, the drain and the gate of the MOS transistor 84 are connected to a gate of the MOS transistor 85. A source of the MOS transistor 85 is connected to the line of the power source voltage VCC of the dimmer 29. A drain of the MOS transistor 85 is connected to a control terminal Cont of the dimmer 29.

Therefore, with the control current circuit 63, the transconductance amplifier converts the voltage Vrs to a current and the current mirror circuit outputs an output current Icont1 obtained by performing constant multiplication of the current after the conversion.

The output current Icont1 outputted by the control current circuit 63 and an output current Icont0 outputted by the constant-current source 66 are added to obtain the control current Icont. The control current Icont is supplied to the control terminal Cont of the dimmer 29. There is a case where a variable resistor is connected to the dimming input terminal Dim, where a resistance value of the constant-current value setting resistor 32 is zero (resistor connection terminal Rs is connected to the ground), and where the output current Icont1 is zero. In such a case, the output current Icont0 outputted by the constant-current source 66 is used for outputting a current from the control terminal Cont and generating a control voltage Vcont.

As illustrated in FIG. 5, a DC voltage or a voltage Vcont generated by an analog external control signal Cont-sig based on a drop in voltage in a variable resistor and the reference voltage Vref are inputted to the AD converter 64. The AD converter 64 converts the ratio of the voltage Vcont (or a voltage obtained by dividing the voltage Vcont) to the reference voltage Vref to a digital signal. The resolution of the AD converter 64 is set to (m+1) bits. Therefore, the AD converter 64 outputs digital signals AD-data-0 through AD-data-m obtained by representing the voltage Vcont by (m+1) bits.

As illustrated in FIG. 6, the output signal generation circuit 65 includes an (m+1)-bit counter 91, a data match circuit 92, and an RS flip-flop 93. The output signal generation circuit 65 generates an output signal PWM-sig with the same duty ratio as a DC voltage or a control ratio of a variable resistor (ratio of an actually applied resistance value of the variable resistor to the maximum resistance value of the variable resistor) detected by the AD converter 64. However, the frequency (first frequency) of the output signal PWM-sig corresponds to the low-pass filter made up of the resistor 55 and the capacitor 56 included in the feedback circuit 23 (1 kHz in the example of FIG. 6).

The counter 91 includes (m+1) D flip-flops. An XQ output of each D flip-flop is connected to its data input terminal. Furthermore, a Q output of a D flip-flop at the preceding stage is connected to a clock terminal (negative logic) of each D flip-flop at second and subsequent stages. A clock signal having a frequency (second frequency) of 2(m+1) kHz and a reset signal having a frequency of 1 kHz are inputted to the counter 91.

The data match circuit 92 compares the digital signals AD-data-0 through AD-data-m outputted by the AD converter 64 with output signals of the D flip-flops included in the counter 91. Only when the digital signals AD-data-0 through AD-data-m match the output signals of the D flip-flops for all bits, the data match circuit 92 outputs an H-level match signal. In this example, exclusive NOR circuits XNOR0 through XNORm are used in the data match circuit 92 for making a comparison for all the bits. An AND circuit AND is used for determining whether outputs of all of the exclusive NOR circuits XNOR0 through XNORm are at an H level (whether inputs of each of the exclusive NOR circuits XNOR0 through XNORm match).

A 1 kHz pulse signal, which is a reset signal of the counter 91, is inputted to a set input terminal of the RS flip-flop 93 and an output signal of the data match circuit 92 is inputted to a reset input terminal of the RS flip-flop 93. Therefore, each time a 1 kHz pulse signal is inputted, the RS flip-flop 93 outputs an H-level signal. An H level continues until a count value of the counter 91 matches read duty ratio data. As a result, the output signal generation circuit 65 outputs a signal with a duty ratio corresponding to a control ratio of the variable resistor designated by the external control signal Cont-sig. For example, when the brightness of an LED lighting fixture is set by the variable resistor at 100 percent, the output signal generation circuit 65 outputs a pulse signal with a duty ratio of 100%. When the brightness of the LED lighting fixture is set by the variable resistor at 80 percent, the output signal generation circuit 65 outputs a pulse signal with a duty ratio of 80%.

Referring back to FIG. 2, the dimmer 29 further includes the constant-current source 67 which outputs a constant current Iout. An output of the constant-current source 67 is connected via the switch 68 to the photocoupler 45 of the feedback circuit 23. The switch 68 is on-off controlled by a signal outputted by the output signal generation circuit 65. Therefore, the dimmer 29 outputs the output signal PWM-sig obtained by pulse-width-modulating the constant current Iout by the switch 68, that is to say, a current signal indicative of a control ratio of the variable resistor. In the feedback circuit 23, a reference voltage of the variable reference voltage source with which the current error amplifier compares a voltage corresponding to the output current Io is adjusted by this current signal and a target output current value of the output current Io is set to a value corresponding to the control ratio of the variable resistor.

The operation of the dimmer 29 having the above structure will now be described. If a variable DC voltage is applied as the external control signal Cont-sig to the dimming input terminal Dim, no problem arises. Accordingly, a case where dimming is performed by connecting a variable resistor will be described.

First the following problem exists. The dimming range of an LED lighting fixture, which is the load 25, changes depending on the maximum resistance value of a variable resistor connected to the dimming input terminal Dim. In order to solve this problem, the control current Icont is made adjustable according to a resistance value of a variable resistor. This is realized by externally connecting the constant-current value setting resistor 32 to the dimmer 29 and arbitrarily adjusting the resistance value of the constant-current value setting resistor 32 according to the maximum resistance value of the variable resistor. By adopting this method, a value of the control current Icont is made small if the maximum resistance value of the variable resistor is large. If the maximum resistance value of the variable resistor is small, a value of the control current Icont is made large. By doing so, the maximum value of the voltage Vcont generated is set to a value close to the maximum permissible input voltage of the AD converter 64 regardless of the maximum resistance value of the variable resistor.

That is to say, when the power source voltage VCC of the dimmer 29 is equal to or higher than the Zener voltage of the Zener diode 71 of the reference voltage circuit 61, the bias current circuit 62 outputs a constant bias current Irs. Accordingly, when the resistance value of the constant-current value setting resistor 32 is changed, a value of the voltage Vrs is changed. As a result, the output current Icont1 outputted by the control current circuit 63 is changed. Therefore, as illustrated in FIG. 7A, each of the control current Icont and the control voltage Vcont is changed in a certain range. This solves the problem that when a resistance value of a variable resistor is small the brightness of an LED lighting fixture does not reach 100 percent even by maximizing the resistance value or the problem that when a resistance value of a variable resistor is large the brightness of an LED lighting fixture reaches 100 percent before the resistance value is maximized.

Next, as indicated in the example of FIG. 7B in which the Zener voltage is 10.5 V, when the power source voltage VCC of the dimmer 29 is lower than the Zener voltage of the Zener diode 71 of the reference voltage circuit 61, the reference voltage circuit 61 outputs the reference voltage Vref which drops with a drop in the power source voltage VCC. As illustrated in FIG. 7A, when the reference voltage Vref drops, the control current Icont and the control voltage Vcont also drop. At this time the reference voltage Vref and the control voltage Vcont which drop at the same ratio are inputted to the AD converter 64. Therefore, the AD converter 64 outputs a digital signal in which a resistance value of the variable resistor is exactly reflected regardless of a change in the power source voltage VCC. The above relationship between the reference voltage Vref and the control current Icont (control voltage Vcont) does not change until an excessive drop of the power source voltage VCC. Accordingly, as illustrated in FIG. 7C, the control current Icont does not depend on the power source voltage VCC and the duty ratio of a signal outputted by the output signal generation circuit 65 is kept constant in a wide range.

The suitable embodiment has been described. However, the present disclosure is not limited to this specific embodiment. For example, the above power converter is described as a device which adjusts the brightness of an LED lighting fixture. However, the above power converter is also applicable in the same way to a device which adjusts the brightness of an incandescent lamp lighting fixture. In this case, the brightness of the incandescent lamp lighting fixture is adjusted by voltage control. Accordingly, the structure of a current error amplifier and a voltage error amplifier is determined so that the setting of a reference voltage by the output signal PWM-sig performed in the feedback circuit 23 will be performed on the voltage error amplifier side.

The dimmer and the power converter each having the above structure include a control current circuit which converts a drop in voltage caused by an externally connected resistor to a control current. Accordingly, a value of the control current supplied to a variable resistor is arbitrarily changed by changing the resistance value of the externally connected resistor. Furthermore, the dimmer and the power converter include a reference voltage circuit which outputs a reference voltage having a constant value when a power source voltage is higher than or equal to a determined value and which outputs a reference voltage having a value proportional to the power source voltage when the power source voltage is lower than the determined value. Therefore, the dimmer and the power converter have the advantage of being able to suppress the dependency of an output current on the power source voltage.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A dimmer comprising:
    a reference voltage circuit configured to
        output a reference voltage at a constant voltage when a power source voltage is higher than or equal to a predetermined threshold value, and
        output the reference voltage at a voltage proportional to the power source voltage when the power source voltage is lower than the predetermined threshold value;
    a bias current circuit configured to convert the reference voltage into a bias current;
    a control current circuit configured to convert a voltage, generated by supplying the bias current to an externally connected resistor, into a control current;
    an analog-to-digital (AD) converter configured to receive the reference voltage and convert a control voltage, which is generated by supplying the control current to an externally connected variable resistor, into a digital signal based on the reference voltage;
    an output signal generation circuit configured to generate, from the digital signal, a duty ratio signal having a duty ratio corresponding to a control ratio of the variable resistor;
    a first constant-current source configured to output a first constant current; and
    a switch connected to the first constant-current source and configured to be turned on or off by the duty ratio signal.

2. The dimmer according to claim 1, wherein the predetermined threshold value is a Zener voltage of a Zener diode included in the reference voltage circuit.

3. The dimmer according to claim 1, wherein the reference voltage circuit includes:
    a first resistor having a first terminal to which the power source voltage is applied;
    a Zener diode having a cathode connected to a second terminal of the first resistor and an anode connected to ground, and having a Zener voltage that is the predetermined threshold value; and
    a voltage follower circuit having an input terminal connected to a connection point between the first resistor and the cathode of the Zener diode.

4. The dimmer according to claim 3, wherein the reference voltage is a voltage output by the voltage follower circuit, or a voltage obtained by dividing the voltage output by the voltage follower circuit.

5. The dimmer according to claim 1, wherein the bias current circuit includes:
    an operational amplifier having a non-inverting input terminal configured to receive the reference voltage;

a first transistor having a gate connected to an output of the operational amplifier;
a resistor having
one terminal connected to a source of the first transistor and an inverting input terminal of the operational amplifier, and
another terminal connected to ground,
a second transistor having
a drain and a gate, both connected to a drain of the first transistor, and
a source to which the power source voltage is applied; and
a third transistor having a gate connected to the gate of the second transistor, a source to which the power source voltage is applied, and a drain configured to output the bias current.

6. The dimmer according to claim 1, wherein the AD converter is configured to convert a ratio of a voltage, being the control voltage or a voltage obtained by dividing the control voltage, to the reference voltage, into the digital signal.

7. The dimmer according to claim 1, wherein the output signal generation circuit includes:
a counter configured to receive a clock signal having a second frequency higher than a first frequency of the duty ratio signal, perform counting, and to be reset by a signal having the first frequency;
a data match circuit configured to compare a count value of the counter with a value of the digital signal and output a match signal when the count value of the counter matches the value of the digital signal; and
a flip-flop configured to be set by receiving the signal having the first frequency, reset by receiving the match signal, and output the duty ratio signal.

8. The dimmer according to claim 1 further comprising:
a second constant-current source configured to output a second constant current to be added to the control current.

9. A power converter comprising:
a transformer;
a switching element connected in series with a primary winding of the transformer and across which a direct current (DC) voltage is applied;
a power supply control circuit configured to control switching of the switching element;
a rectifying and smoothing circuit connected to a secondary winding of the transformer;
a feedback circuit including
a voltage error amplifier configured to detect a voltage outputted from the rectifying and smoothing circuit and feed the voltage back to the power supply control circuit, and
a current error amplifier configured to detect a current outputted from the rectifying and smoothing circuit and feed the current back to the power supply control circuit; and
a dimmer configured to set a variable reference voltage source of the voltage error amplifier or the current error amplifier, the dimmer including:
a reference voltage circuit configured to
output a reference voltage at a constant value when a power source voltage generated by an auxiliary winding of the transformer is higher than or equal to a predetermined threshold value, and
output the reference voltage at a value proportional to the power source voltage when the power source voltage is lower than the predetermined threshold value;
a bias current circuit configured to convert the reference voltage into a bias current;
an externally connected resistor to which the bias current is supplied;
a control current circuit configured to convert a voltage, generated across the externally connected resistor by supplying the bias current, into the control output and configured to output the control current;
an externally connected variable resistor configured to generate a variable control voltage by the control current being supplied to the externally connected variable resistor;
an analog-to-digital (AD) converter configured to convert the control voltage into a digital signal based on the reference voltage;
an output signal generation circuit configured to generate, from the digital signal, a duty ratio signal having a duty ratio corresponding to a control ratio of the variable resistor;
a constant-current source configured to output a constant current; and
a switch connected to the constant-current source and configured to, by being turned on or off by the duty ratio signal, output a setting signal to set a signal corresponding to the control ratio of the variable resistor in the variable reference voltage source of the voltage error amplifier or the current error amplifier.

* * * * *